United States Patent [19]

Black et al.

[11] Patent Number: 5,325,524
[45] Date of Patent: Jun. 28, 1994

[54] LOCATING MOBILE OBJECTS IN A DISTRIBUTED COMPUTER SYSTEM

[75] Inventors: Andrew P. Black, Westford, Mass.; Yeshayahu Artsy, Nashua, N.J.

[73] Assignee: Digital Equipment Corporation, Maynard, Mass.

[21] Appl. No.: 864,371

[22] Filed: Apr. 6, 1992

Related U.S. Application Data

[63] Continuation of Ser. No. 334,831, Apr. 6, 1989, abandoned.

[51] Int. Cl.⁵ .................. G06F 15/16; G06F 12/00
[52] U.S. Cl. ...................... 395/600; 364/DIG. 1; 364/241.1; 364/942.94
[58] Field of Search .......... 364/DIG. 1, 241.1, 242.94

[56] References Cited

U.S. PATENT DOCUMENTS

| | | | |
|---|---|---|---|
| 4,078,254 | 3/1978 | Beausoleil et al. | 364/900 |
| 4,325,120 | 4/1982 | Colley et al. | 364/200 |
| 4,399,504 | 8/1983 | Obermarck et al. | 364/200 |
| 4,539,637 | 9/1985 | DeBruler | 364/200 |
| 4,633,406 | 12/1986 | Katz et al. | 364/200 |
| 4,649,480 | 3/1987 | Ohki et al. | 364/300 |
| 4,661,903 | 4/1987 | Wallach, Jr. et al. | 364/200 |
| 4,694,396 | 9/1987 | Weisshaar et al. | 364/200 X |

OTHER PUBLICATIONS

Guy T. Almes et al., "The Eden System: A Technical Review," IEEE Transactions on Software Engineering, vol. SE-11, No. 1, Jan., 1985.
Robert Joseph Fowler, "Decentralized Object Finding Using Forwarding Addresses," Technical Report 85-1-2-1, Department of Computer Science, FR-35, University of Washington, Seattle, Washington 98195, 1985.
Robert Joseph Fowler, "The Complexity of Using Forwarding Addresses for Decentralized Object Finding," Proceedings of the Fifth Annual ACM Symp. on Principles of Distributed Computing, Aug. 11-13, 1986.
Eric Jul et al., "Fine-Grained Mobility in the Emerald System," ACM Transactions on Computer Systems, vol. 6, No. 1, Feb., 1988, pp. 109-133.

Primary Examiner—Gareth D. Shaw
Assistant Examiner—A. Katbab
Attorney, Agent, or Firm—Fish & Richardson

[57] ABSTRACT

A system and method are disclosed for locating mobile objects in a distributed network having a large number of nodes connected by a communication network, each object supported by a stable storage server. The system uses either a two level or three level method to provide reliable and economical location of objects. The levels are increasingly expensive, but increasingly reliable. In the first level, address descriptors or forwarding addresses are used to retrace the mobile object's movements from node to node, each node ideally having an address descriptor indicating the location of the next node to which the object moved. If this strategy fails, the second level (which is more expensive and more reliable than the first) is used and includes accessing stable storage to find a current address descriptor for the object. If the object still cannot be located, the most expensive and most reliable level is used, i.e., a universal name service.

14 Claims, 9 Drawing Sheets

In Foo.mod (User-invocable Stubs)

(* This is the stubs module invoked by the external users of Hermes (through Invoke).
It is generated from FooOps.def *)

IMPORT FooRemote, LIISupport, RPCSupport, InvokeRemoteClient;

```
PROCEDURE P (target: ObjectId; a1: T1; a2: INTEGER)
            RAISES { Object.Unavailable, Object.InvalidId };
VAR
   myTad : LIISupport.Tad;
   LIIErrors: LIISupport.Errors;
   RPCErrors: RPCSupport.CallErrors;
   exception: FooRemote.Exception;

BEGIN
   IF LIISupport.TryToFix(target, myTad) THEN          (* Good, target is local *)
      (* Exceptions such as Object.InvalidId or Unavailable(Moving, dead) are propagated to the user *)
      TRY                                              (* to finally Unfix *)
         FooOps.P(target, a1, a2); RETURN
      FINALLY
         LIISupport.UnFix(target);
      END (*Try*)
   END (*If*);

(* target is remote --> call FooRemote via RPC *)
   remoteTad := myTad;                                 (* to let the callee know my Tad *)
   LOOP                                                (* until target is found or cannot be reached *)
      TRY                                              (* to get a binding and do RPC *)
         IF InvokeRemoteClient.FooP(
                  LIISupport.GetBinding (remoteTad.node),(* arg to RPC *)
                  a1, a2,                              (* P's arguments *)
                  remoteTad, 0, exception)
               = LIISupport.Returned THEN
            (* remoteTad is updated at this point *)
            LIISupport.UpdateTad(target, remoteTad);
            RETURN;
         ELSE                                          (* The call has been Aborted *)
            LIISupport.UpdateTad(target, remoteTad);
            CASE exception.which OF
               | FooRemote.ObjUnavailable:
                     RAISE(Object.Unavailable, exception.whyUnavailable)
            END (*Case*)
         END (*if*)
      EXCEPT
         | LIIsupport.NoBinding (LIIErrors):
               RAISE(Object.Unavailable, Object.CannotBind);
                  (* future extension: return a more detailed reason *)
         | RPCSupport.CallFailed (RPCErrors):
               RAISE(Object.Unavailable, Object.CommunicationFailed);
                  (* future extension: return a more detailed reason *)
```

FIG. 6A

END (*Try*)

(* We get here only if the RPC has been *Aborted*, with exception.which = MaxHopsExceeded *)
(* Note that the new remoteTad is guaranteed to be newer, so we can continue to iterate *)
END (*Loop*)

END P;

FIG. 6B

```
                In  FooRemote.mod   (Invoked by LII Stubs only)
     IMPORT InvokeRemoteClient, RPCSupport;

PROCEDURE P(target: Object.Id; a1: FooOps.T1; a2: INTEGER)
                VAR remoteTad: LIISupport.Tad;
                hops: CARDINAL;
                VAR (*OUT*) exception: Exception
                ) : LIISupport.callOutcome;
     VAR
        myTad : LIISupport.Tad;
        LIIErrors: LIISupport.Errors;
        RPCErrors: RPCSupport.CallErrors;

BEGIN
        TRY                                              (* To catch TryToFix's exceptions *)
            IF LIISupport.TryToFix(target, myTad) THEN   (* Good, target is local*)
                remoteTad := myTad;                      (* in case their ages differ *)
                TRY                                      (* to finally UnFix target *)
                    FooOps.P(target, a1, a2);
                    (* note: assuming no exceptions here *)
                    RETURN (LIISupport.Returned)
                FINALLY
                    LIISupport.UnFix(target);
                END (*Try*)
            END (*If*)
        EXCEPT
           | Object.Unavailable(exception.whyUnavailable):
                    exception.which := ObjUnavailable;
                    remoteTad := myTad;                  (* in case their ages differ *)
                    RETURN (LIISupport.Aborted);
        END (*Try*);

(* Check if can call another Remote stub, and if so, prepare for the RPC *)
        IF LIISupport.Newer(remoteTad, myTad) THEN        (* my tad is obsolete *)
            TRY                                           (* to get a newer tad from the SS *)
                myTad := LIISupport.FindInSSAndActivate (target);
            EXCEPT
               | Object.SSUnavailable:                    (* make a newer Tad -- to somewhere *)
                    LIISupport.MakeNewerTad(target, remoteTad);
                    exception.which := ObjUnavailable;
                    exception.whyUnavailable := Object.SSUnavailable;
                    RETURN (LIISupport.Aborted);
            END (*Try*)
```

FIG. 6C

```
END (*If*);

remoteTad := myTad;
IF hops >= LIISupport.MaxHops THEN
    exception.which := MaxHopsExhausted;
    RETURN (LIISupport.Aborted);
END (*If*);

(* Finally, we get to call our peer FooRemote via RPC *)

TRY                             (* to get a binding and do RPC *)
    TRY                         (* to invoke and finally update tad *)
        RETURN (InvokeRemoteClient.FooP(
                LIISupport.GetBinding (myTad.node),  (* arg to RPC *)
                a1, a2
                remoteTad, hops+1, exception);
                    (* Tad and exception get updated by callee and passed back *)
    FINALLY LIISupport.UpdateTad(target, remoteTad);
    END (*Try*)
EXCEPT
    | LIIsupport.NoBinding (LIIErrors):
            exception.which := ObjUnavailable;
            exception.whyUnavailable := Object.CannotBind;
            RETURN (Aborted);
    | RPCSupport.CallFailed (RPCErrors):
            exception.which := ObjUnavailable;
            exception.whyUnavailable := Object.CommunicationFailed;
            RETURN (Aborted);
END (*Try*);

END P;
```

FIG. 6D

LOCATING MOBILE OBJECTS IN A DISTRIBUTED COMPUTER SYSTEM

This is a continuation of application Ser. No. 07/334,831 filed Apr. 6, 1989, now abandoned.

BACKGROUND OF THE INVENTION

This invention relates to the location of objects in a distributed computer system.

Computer programs are contained in a defined portion of memory known as the address space of the program. A local procedure call ("LPC") is a well known mechanism for the transfer of control and data within a single address space. A remote procedure call ("RPC") is an extension of this mechanism to provide for transfers between different address spaces.

Figure 1:
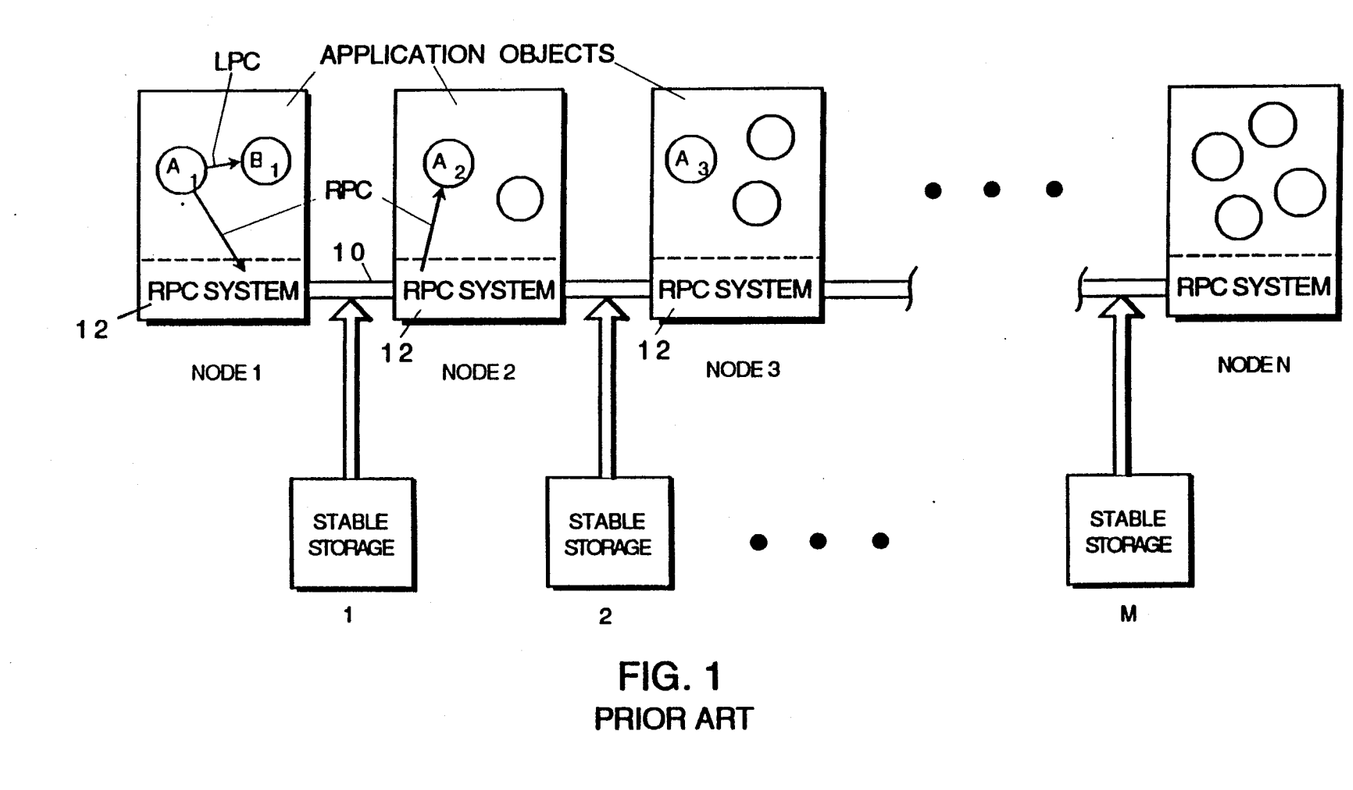
FIG. 1 is a block diagram of a prior art distributed system.

FIG. 1 shows a distributed system having nodes 1, 2, 3 ... N, the nodes connected by some communication link 10 (e.g., coaxial cable (e.g. Ethernet), fiber optic link, modem and telephone lines, or anything that connects two nodes such that they can communicate). Each node is defined as one address space. (It should be noted, however, that a node can be defined as more than one address space.) Each node contains one or more application objects such as $A_1$ and $B_1$ at node 1, $A_2$ at node 2, etc. The nodes are typically supported by stable or non-volatile storage servers 1, 2 ... M. Each node also includes an RPC system 12, is included in a host system (not shown) and is supported by standard services not shown in FIG. 1, such as run time support and communication services, etc.

Application objects often need to "invoke" other objects, or locate other objects, usually for the purpose of performing some operation on the objects. An object can be invoked without performing any operation on the object if, for example, it is merely necessary to determine the object's location. (This is an unusual case and most invocations will be for the purpose of performing an operation on the object.) Application object $A_1$ can invoke $B_1$ with an LPC since both objects are contained in the same node. However, $A_1$ must use an RPC to access objects at other nodes, such as $A_2$. When using an RPC, the original or calling object (also called the "client") must indicate the location of the node to which the RPC is to be directed A node that accepts an RPC is known as a "server." The client typically identifies the server and establishes the relationship between the client and server. To accomplish this, the client must pass an explicit or implicit argument to every RPC. This argument is a data structure, known as a binding, that includes the address of the server and possibly additional information such as the communication protocol and data representation on its host.

It is generally a goal of an RPC implementation to make the semantics of an RPC as close as possible to those of an equivalent LPC. This enables programmers to write distributed applications (i.e., applications distributed among two or more nodes) without having to be aware of or take into account network protocols or external data representations.

Locating the proper server (i.e., locating invoked objects) is sometimes difficult and is a burden on the programmer. Several methods have been developed to reduce the burden of the binding step on the programmer by automating the location of the server to at least some extent.

One method is known as default binding, where the RPC system chooses the server, either non-deterministically, or in a way that depends on factors that are normally hidden from the client, such as network distance.

Location independent invocation ("LII") is a method of completely relieving the programmer of the burden of choosing the server. In other words, the programmer can treat an RPC in the same way as an LPC. LII can be implemented at the application level, in which an application dependent sub-routine package uses its knowledge of the call semantics to choose the server For example, in an environment in which a file name indirectly identifies the file server that stores the file, a file system "clerk" might be used to direct an RPC to the appropriate server.

In large distributed systems it is desirable to permit application objects to move between address spaces for a variety of reasons. For example, mobile objects increase availability and reconfigurability, will allow special capabilities of a particular machine to be utilized by moving the object to that machine, and may reduce communication costs. In addition, object mobility provides a convenient way for application data to be moved to the point where it is needed without the necessity of making a copy and keeping it consistent with the original As an example of such a mobile object, consider an expense voucher circulating within a corporation over a large distributed network having many nodes (each node potentially corresponding to a user station). A form is filled in by an employee and electronically signed by different managers who approve or reject the expense reimbursement represented by the form. If appropriate, the accounting department will make a petty cash disbursement and then the form may be archived for tax and audit purposes. The people acting on the form may all be located in one building or may be at different locations throughout the world. Storing these forms at a central location is impractical since each person working on the form desires a short interactive response time. Sending commands over great distances to a central storage area would result in a slow response time and high communication costs. Therefore, it is desirable to move the object to the node most convenient to the current user.

Finding the proper server node becomes increasingly difficult when invoking mobile application objects. One solution is to inform all instances of the distributed application program of each move and of the new address of the object, so that, e.g., each can record the new location of the object.

Systems have also been developed that use "forwarding addresses" to locate objects that have moved. If an object moves from a first node to a second node, the first node stores a forwarding address that includes the location of the second node and the time that the object moved. Each forwarding address includes a time component so that if two forwarding addresses are obtained for the same object, the system can select the newer address and thereby obtain more current information on the object's location. The time can be real time or it can be given by the number of moves that an object has made. If one forwarding address has a "time" of 3 moves and another forwarding address for the same object has a "time" of 4 moves, then the second address must be more current than the first since the object's address after 4 moves must be more recent (or younger) than its address after three moves.

If the object moves several times, each old node will have the address of the next node to which the object moved thereby creating a "chain" that can be followed to locate the object.

SUMMARY OF THE INVENTION

A system and method are disclosed for locating mobile objects in a distributed network having a large number of nodes connected by a communication medium. A number of storage sites are also connected to the communication medium. The system uses either a two level or three level method to provide reliable and economical location of objects. The levels are increasingly expensive, but increasingly reliable. In the first level, address descriptors or forwarding addresses are used to retrace the mobile object's movements from node to node. At each node which formerly contained the object, an address descriptor is stored which indicates the location of the next node to which the object moved. If this strategy fails, the second level (which is more expensive and more reliable than the first) is used and includes accessing stable storage to find a current address descriptor for the object. If the object still cannot be located, the most expensive and most reliable level is used, i.e., a universal name service.

The invention includes a method for invoking objects in a distributed system comprising a plurality of nodes linked by a communication medium, wherein each of said objects is supported by one or more stable storage servers, the method comprising the steps of: (a) generating at an invoking node, an invocation directed to an object, the invoking node initially constituting a current node; (b) performing the invocation if the object is located at the current node and returning to step (a); (c) determining if the current node has an address descriptor corresponding to the object that is different than any previously found address descriptor for the object and, if it does, sending the invocation to a node identified in the address descriptor, the identified node becoming the current node, and returning to step (b); and (d) locating an address descriptor corresponding to said object in a stable storage server supporting the object, sending the invocation to a node identified in the located address descriptor, said identified node becoming the current node, and returning to step (b).

In the preferred embodiment, step (d) further includes locating an address descriptor in a second stable storage server if the first stable storage server does not contain an address descriptor corresponding to the object. The first stable storage server may include a pointer to the second stable storage server, the pointer being maintained for at least a predetermined period of time. When an object moves from one node to a second node, the stable storage server supporting that object is sent a message including the new address of the object. The stable storage servers can also be periodically updated. The address of the second stable storage server can also be obtained from a universal name service.

In the preferred embodiment, the address descriptors are temporal address descriptors and the invention determines if the current node has a different address descriptor by determining if the current node has an address descriptor that was more recently created than any address descriptor previously located. The temporal address descriptors include an age, where the age is measured by the number of times an object has moved between nodes. Step (b) comprises returning any results of the invocation to the invoking node and returning an address descriptor to the invoking node.

The invention also generally comprises a method for invoking objects in a distributed system comprising a plurality of nodes linked by a communication medium, wherein each of the objects is supported by one or more stable storage servers, the method comprising the steps of: (a) generating, at an invoking node, an invocation directed to an object; (b) performing the invocation if the object is located at the invoking node and returning to step (a); (c) locating an address descriptor corresponding to the object in a stable storage server supporting the object; (d) sending the invocation to a node identified in the address descriptor; and (e) performing the invocation at the identified node.

The invention is more reliable and economical than prior art systems since more than one type of locating strategy is employed in a method for locating mobile objects that has at least two levels, and has three levels in the preferred embodiment. The strategy used in the first level is the least expensive, while the strategy used in the last level is the most reliable. The system only uses the costlier second level if the first level is unsuccessful, and uses the most expensive third level only if the second level fails. In this way, mobile objects are located using the most efficient available method, without sacrificing reliability.

DETAILED DESCRIPTION OF THE PREFERRED EMBODIMENTS

Drawings

We first briefly describe the drawings.

FIGS. 6A-D show pseudo-code for two sample stubs implementing the method of the invention.

STRUCTURE

Figure 2:
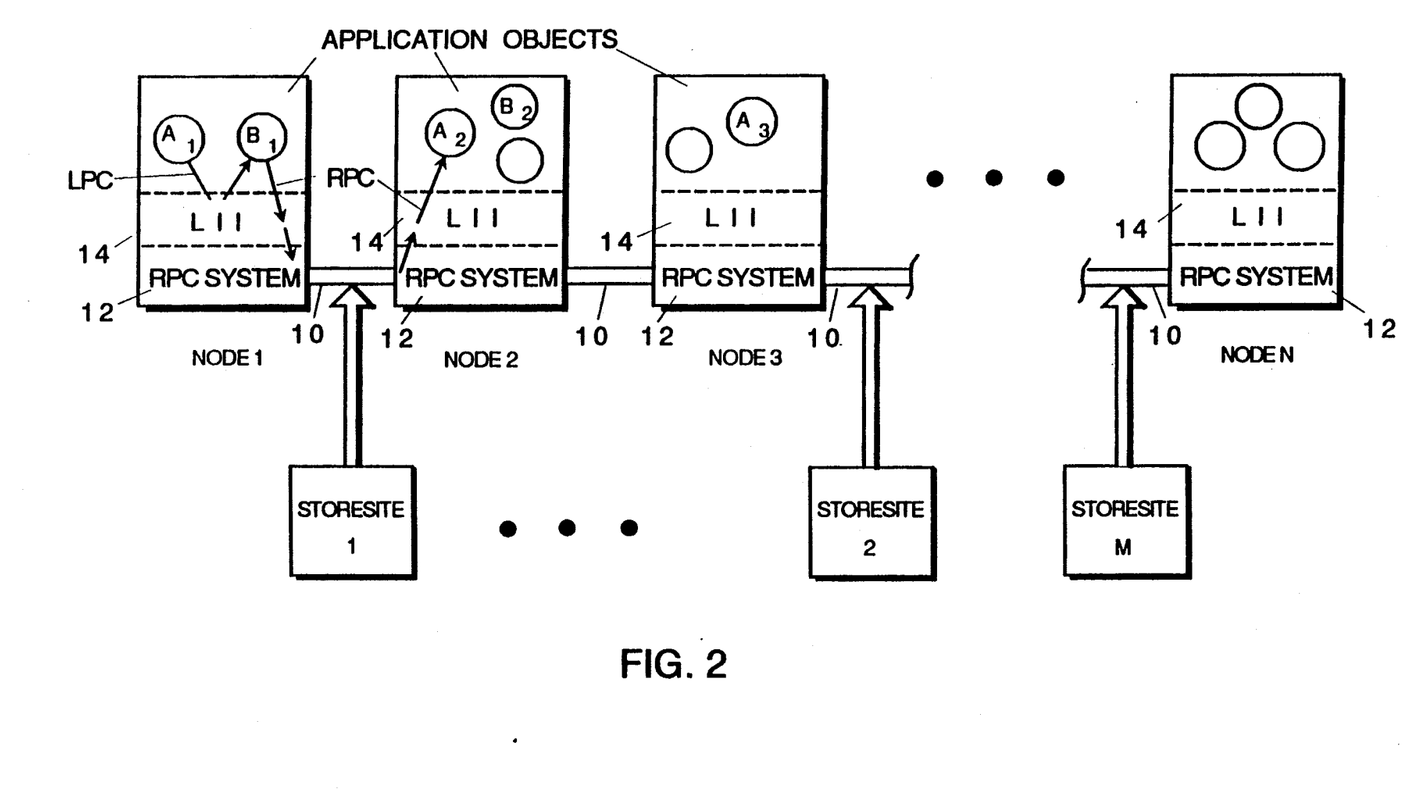
FIG. 2 illlustrates a distributed system according to the invention.

Referring to FIG. 2, a distributed system having nodes 1, 2 ... N is shown, with each node including a number of application objects $A_1$, $B_1$, $A_2$, etc. Each node has an LII (location independent invocation) layer 14 as well as a standard RPC system 12. The network includes stable storage servers or "storesites" 1, 2 .. M (e.g., hard disk storage devices) with each storesite supporting one or more objects that exist in one or more nodes The storesites may be any storage medium that ensures that the data it contains may be recovered if a node should crash. The nodes and storesites are linked through a communication network 10. The complete system includes one or more host systems and other standard components (not shown).

Operation

Figure 3:
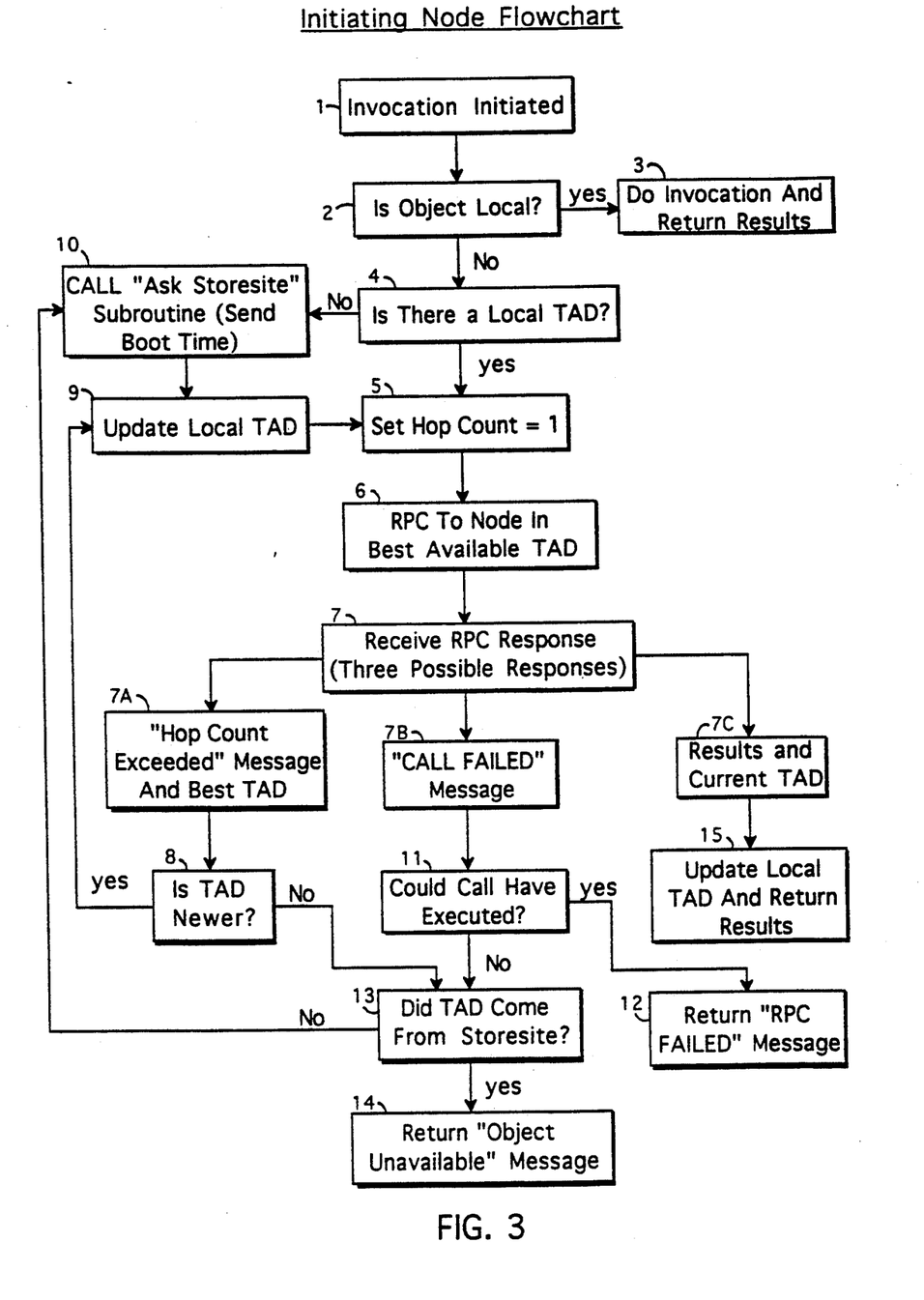
FIGS. 3-5 are flowcharts illustrating the method of the invention.
Figure 4:
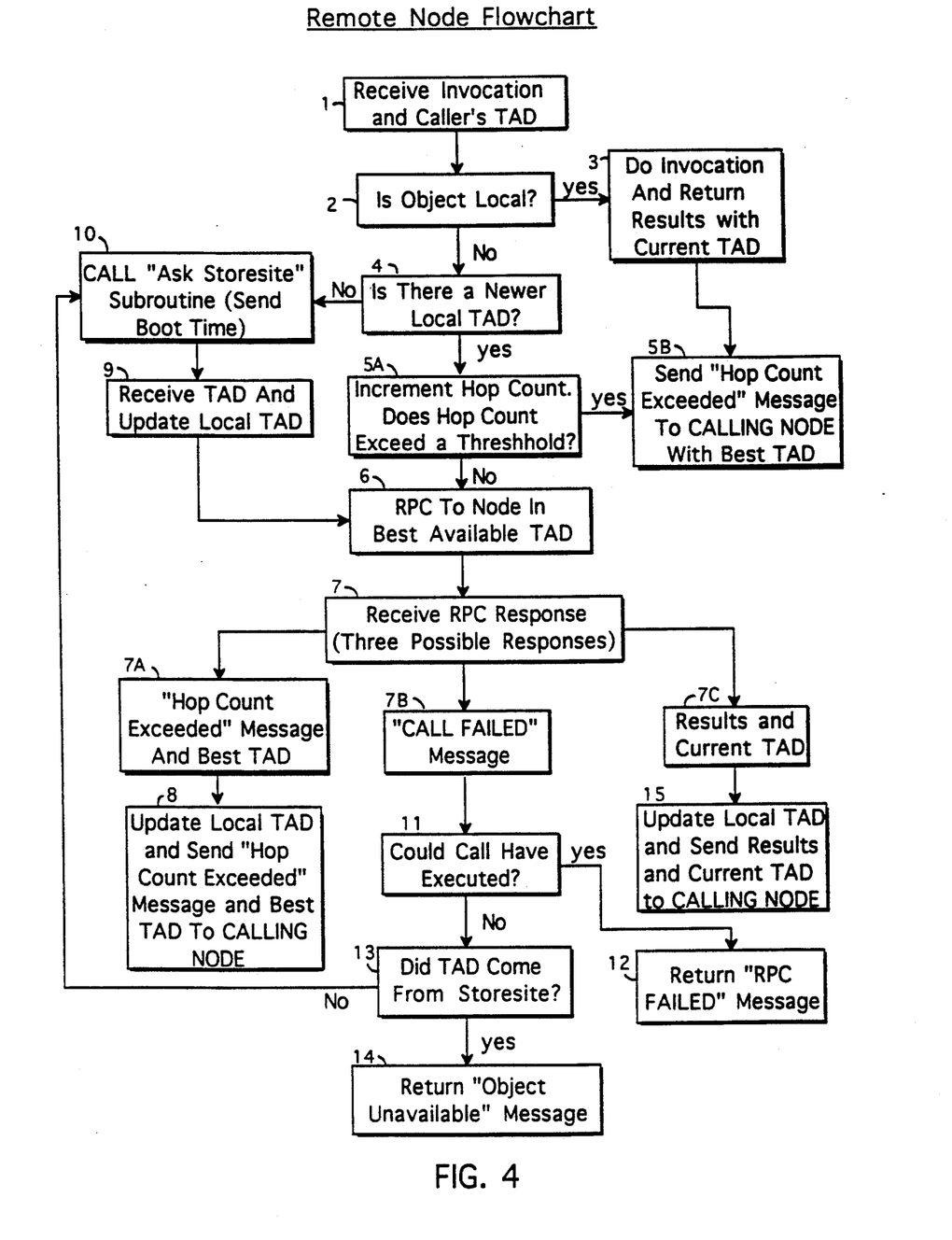
Figure 5:
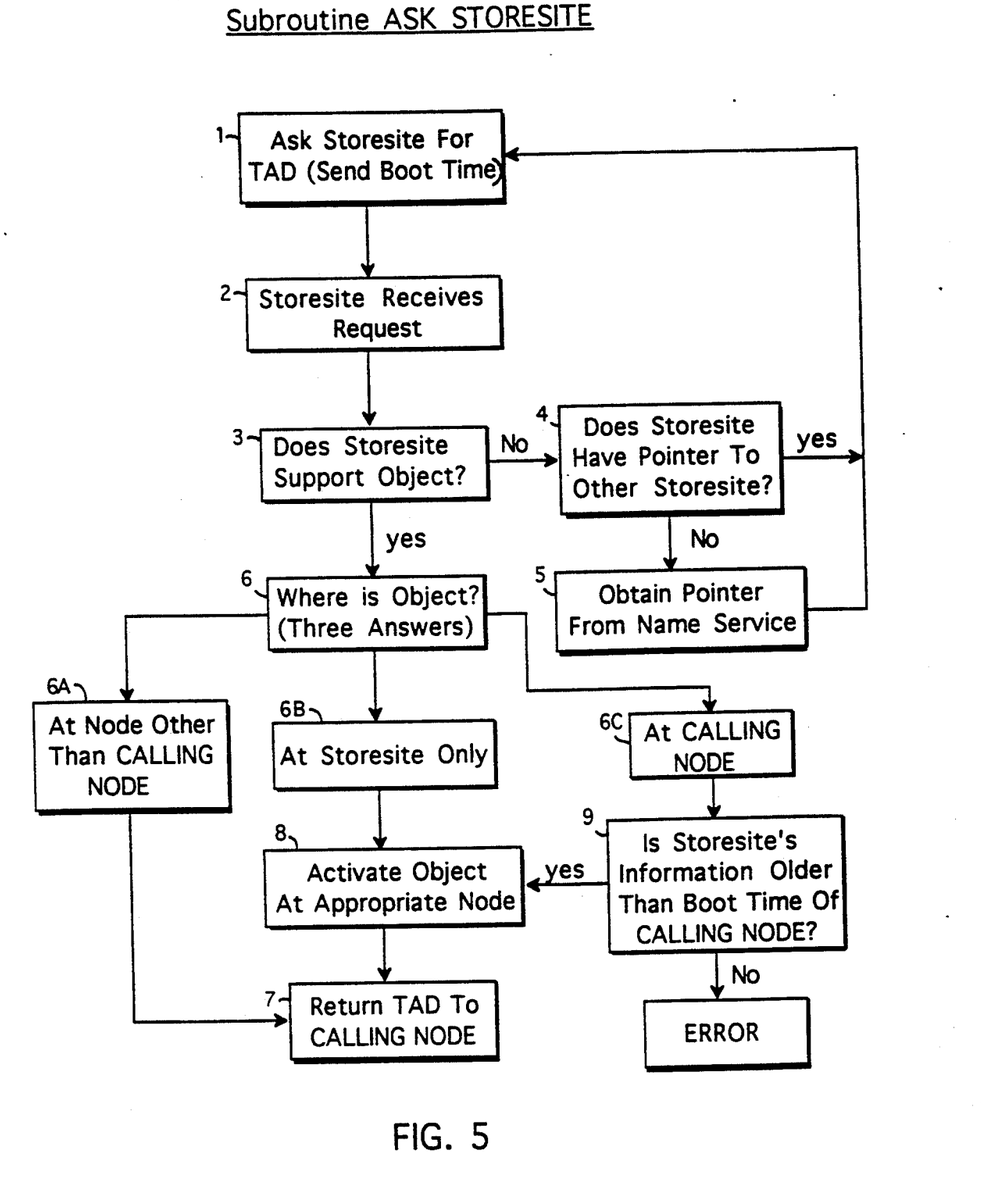
Figure 6B:
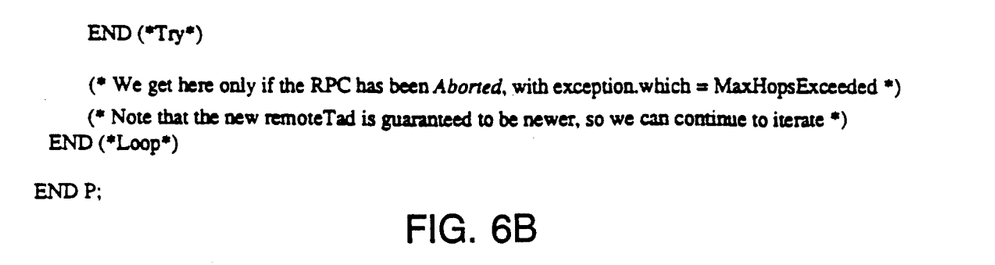
Figure 6C:
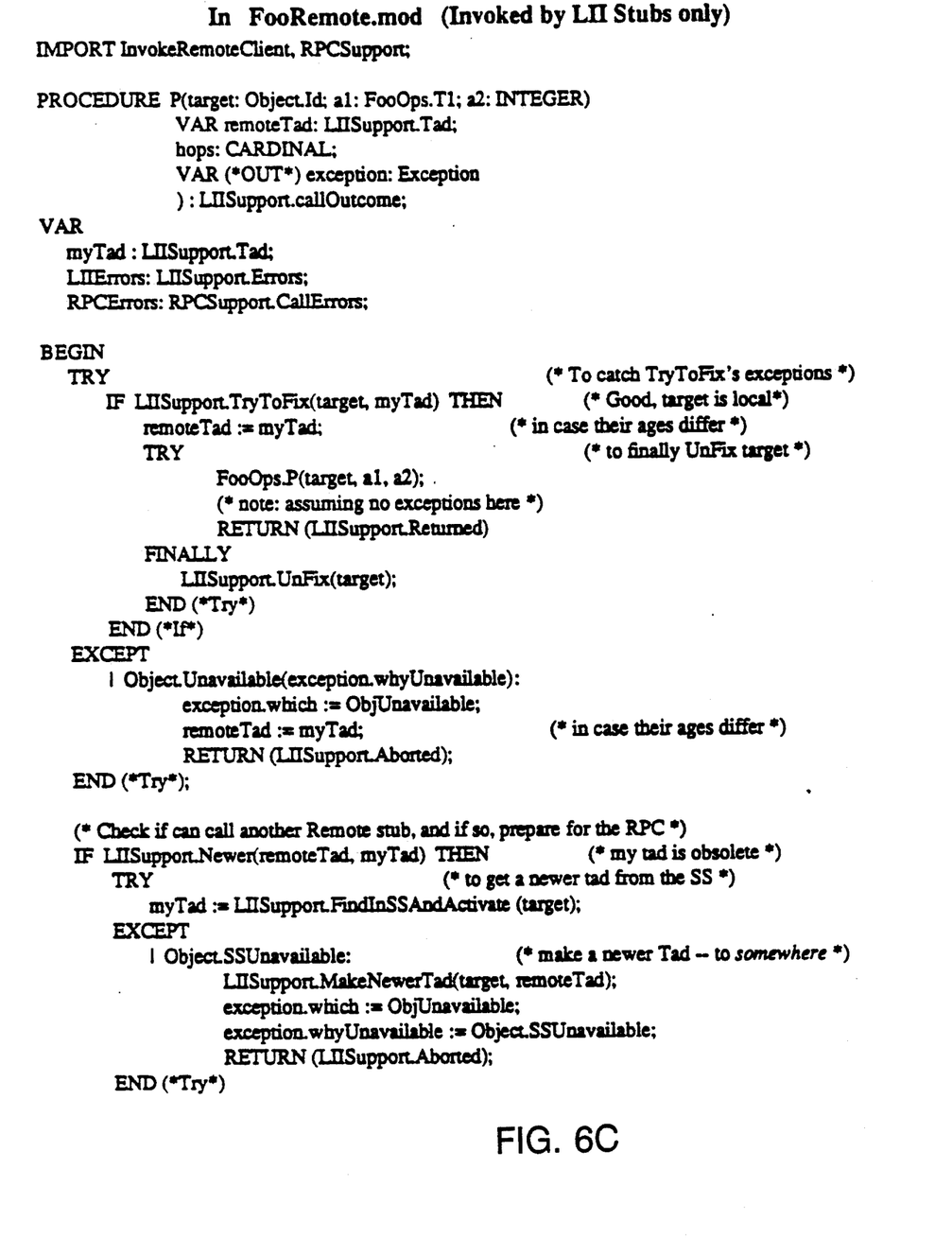
Figure 6D:
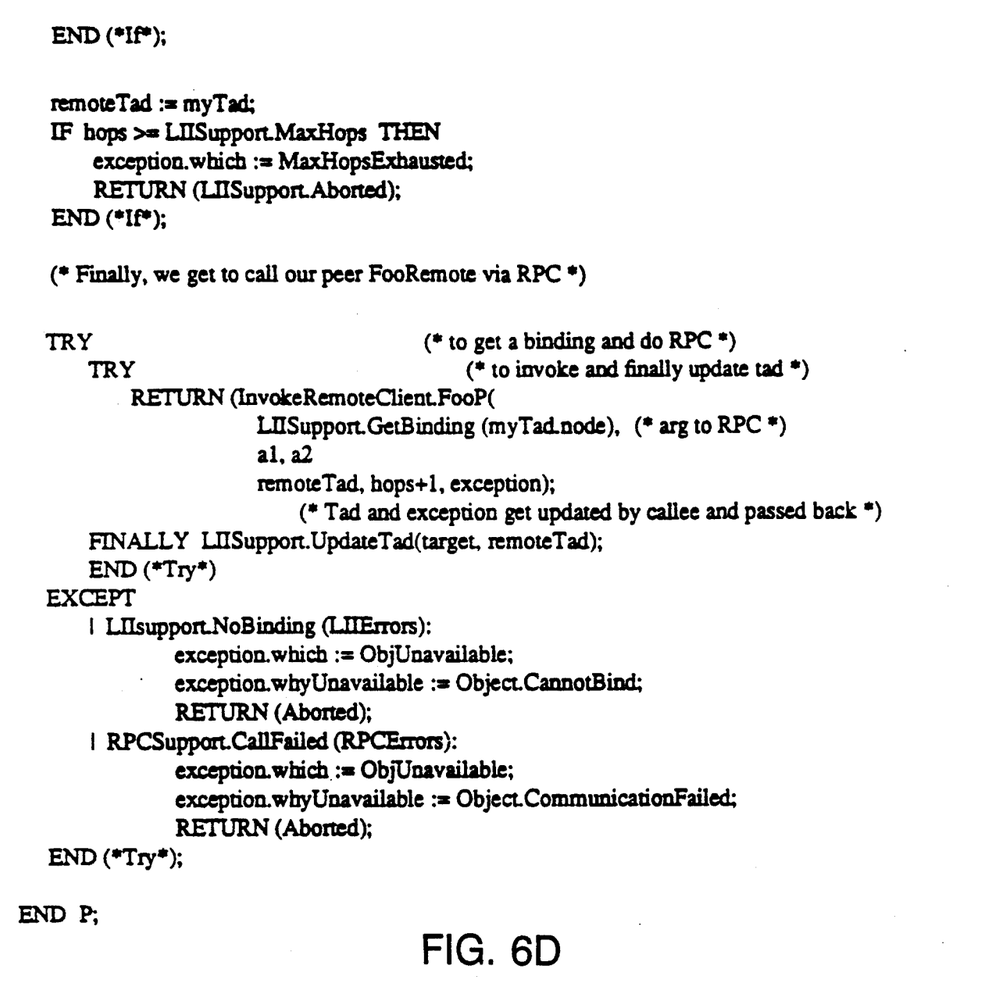

Referring to FIG. 2 and to the flowcharts of FIGS. 3-5, when an object such as $A_1$ invokes an object on the same node, such as object $B_1$, node 1 is the "initiating node" since the initiating object is located there. All invocations are carried out through the LII layer and FIG. 3 illustrates the steps carried out at the initiating node. After the invocation is initiated (step 1) the LII layer determines whether or not the invoked object (e.g., $B_1$) is located locally (step 2). A local object is one that is located at the node where the invocation is currently attempting to execute (the "current node"). In this case the object is local since it is located at the initiating node (where the invocation is currently executing) and is called by an LPC with the results returned to $A_1$ (step 3).

If an object invokes an object at a node other than the node where the invocation is initiated (i.e., a "remote node") (e.g. if object $B_1$ invokes object $A_2$), an RPC (remote procedure call) is necessary. In this case, the invoked object is not local (step 2), and the LII layer of the current node will determine if the current node contains either a forwarding address or a temporal address descriptor ("TAD") for the object (step 4). A forwarding address is a pointer to the node the object moved to after it left the current node. A TAD is an ordered pair of two values, one value being a forwarding address and the other value being the "time" at which the object moved to, or was located at, the node pointed to by the forwarding address. The time is measured by the number of moves (i.e., the number of moves between nodes) that the object has made since its creation. Each node will keep a "stash" of TADs including a TAD for every object that is presently located at that node or was located at the node at some time in the past. Each stash will also contain TADs that have passed through the node. Therefore, the initiating node will normally have a TAD for the invoked object.

Assuming that a local TAD exists, after setting a "hop count" (discussed below) equal to one (step 5), the LII layer will perform an RPC to the LII layer at the node described in the local TAD (step 6). The steps carried out at the remote node (i.e., the node to which the invocation was sent) are illustrated in FIG. 4, discussed below.

The initiating node will receive one of three possible responses from the RPC system (step 7). First, the initiating node may receive a message that the hop count has exceeded a threshold. Second, the initiating node can receive an "RPC Failed" message. Finally, the initiating node may receive results indicating that the invocation was successfully executed. Each of these three responses are discussed in turn.

The hop count is used to limit the number of hops that an invocation can take before returning to the initiating node. In other words, the invocation could arrive at a remote node and find a TAD to a second remote node and move to the second remote node and find a TAD to a third remote node, etc. This hopping from node to node can continue for a large number of nodes (assuming the object is not found and newer TADs are found, as discussed below). It is undesirable to let the "chain" get too long since, e.g., if one of the nodes in the chain crashes, one of the "links" in the chain will be broken and the results of the invocation will not find their way back to the initiating node. Therefore, we use the hop count (set initially to one in step 5, and incremented by one for each hop) to limit the number of hops. When the hop count exceeds a predetermined value (e.g., five hops), a message noting that the hop count has been exceeded is returned to the initiating node with the best available TAD. If that TAD is newer than the TAD stored at the initiating node (step 8), the local TAD is updated (step 9), the hop count is reset (step 5), and the process repeats (step 6). If the TAD is not newer, the stable storage server supporting the object is accessed, as discussed below.

Each object is supported by a stable storage server or storesite that keeps the information necessary to restore a copy of the object, and also stores a current TAD for the object. Whenever the object moves from one node to another node, the storesite supporting the object is updated with the new address. Also (or alternatively), each node can periodically supply updated addresses to the storesites supporting all objects located at that node.

The LII layer will attempt to obtain the object TAD from the storesite (step 10) if there was initially no local TAD at the initiating node (step 4), or a remote node returned a TAD that was not newer than a TAD previously used unsuccessfully (step 8). The storesite is utilized in one other situation discussed below.

To obtain a TAD from the storesite, a subroutine "Ask Storesite" is called. Referring to FIG. 5, in step 1 of the subroutine the node calling the subroutine sends a message to the storesite asking for the object's TAD. (The boot time of the calling node is also sent to the storesite for reasons described below.) Once the storesite receives the message (step 2), it determines whether it still supports the object (step 3). It may be desirable to change the storesite that supports an object if, for example, the object is most often used by a particular employee who moves to a new location. Since it is generally more efficient to have an object's storesite close to the node at which the object is most often used, the object's storesite is changed to one near the employee's new location When the storesite is changed, a pointer is stored in the old storesite which will point to the new storesite location. Therefore, if the storesite no longer supports the object, it will initially have a pointer to a new storesite (step 4) and the request is retransmitted to the new storesite (step 1).

In order to obviate the need to permanently store a pointer at an old storesite, a universal name service is used. The universal name service is a service that stores specified attributes for uniquely named entities. The attributes may be accessed by anyone (or any system) that can supply the unique name to the name service. In the present invention the name service will store a pointer to the address of the current storesite that supports each object and that information may be determined through the object's GUID. The name service typically has multiple copies of the information at different locations to make the information more readily accessible. An object's GUID and storesite address is entered into the name service after the object's storesite is changed for the first time. There is no need to store the address of the object's original storesite with the name service because this information is included in the GUID. Thereafter, every time an object's storesite is changed, the name service is updated, and the updated information propagates throughout all of the locations having name service data. The old storesite therefore only needs to store the pointer long enough to ensure that the new storesite address completely propagates throughout the name service. Thereafter, an old storesite may not have a pointer (step 4) and the name service is accessed by the object's GUID to obtain a new pointer (step 5). The request is then transmitted to the new storesite (step 1).

Once the proper storesite is located (step 3), the storesite is asked to return a TAD for the object (step 6). There are three possibilities that may be encountered by the storesite. First, the storesite may have information indicating that the object is at a mode other than the calling node (step 6A), and will return a TAD indicating this node (step 7).

Second, the storesite may have information indicating that the object is not active on any node but exists only at the storesite (step 6B). In this situation, the storesite will activate the object on an appropriate node (e.g., first available or calling node, etc.) (step 8) and will generate and transmit a TAD to the calling node (step 7).

Third, the storesite have information indicating that the object is active at the calling node (step 6C). In this case, the storesite will determine whether its information is older than the boot time of the calling node (step 9). Since a node should not call the "Ask Storesite" routine if the object is active at that node (refer to step 2 in FIGS. 3-4), the most likely reason that the storesite would think the object is at the calling node is that the calling node crashed at some time in the past and lost the object, and then rebooted. Therefore, if the storesite's information is older than the boot time, the storesite will assume that the node must have crashed and will activate the object at an appropriate node (step 8) and return a TAD (step 7).

However, if the storesite's information that indicates the object is at the calling node is not older than the boot time, there must be a system protocol error (e.g., the storesite has faulty information). It is also possible that the storesite does not respond to the request for a TAD, if e.g., the communication link is broken. Both of these possibilities are rather unlikely and the method illustrated in the figures assumes that a TAD will be returned from the storesite. However, in the preferred embodiment, if the storesite should fail to respond to a request, the calling node would send a request to the name service in case the storesite has been changed. The request would be attempted again if a new storesite is identified. If a newer storesite cannot be located, an "object unavailable" message is returned.

Referring again to FIG. 3, when the storesite returns the TAD, the initiating node will update its local TAD (step 9) and make another RPC to the node in the new TAD (step 6).

The second possible response from the RPC is an "RPC Failed" message (also called an exception) (step 7B). This could happen in several different circumstances. For example, a communication line could break or the sought object may be active at a node that is unavailable.

When an RPC system returns an "RPC Failed" message, it also will indicate whether or not the call could have executed. This depends in part on the communication system being used. For example, if the communication protocol entails sending the invocation (and other data) along a common carrier (e.g., an ethernet cable) and waiting for a reply, it may be impossible to determine whether the RPC executed. The remote node could have received the message and executed the call but was unable to respond. (E.g., the communication line may have been damaged after the remote node received the invocation, but before it could respond.) In circumstances like these, where the call could have executed (step 11), an "RPC Failed" message is returned (step 12).

The RPC system may also report that the call could not have executed. For example, the communication protocol may require that a remote node acknowledge its readiness to accept data before the invocation is sent. If the remote node does not acknowledge, the RPC system knows that the invocation did not execute since it did not transmit the invocation (step 11). In this case, the system will determine whether or not the TAD used for the RPC came from a storesite (step 13). Since the RPC was unable to successfully execute the invocation to the node described in the local TAD, the LII layer will check to see if there is possibly a better or more recent TAD available. The most recent TAD information is generally stored on the storesite supporting the object. Therefore, if the TAD used in the RPC did not come from a storesite (step 13), the system will call the "Ask Storesite" subroutine (step 10) to try and locate a more recent TAD. If the TAD used in the failed RPC did come from a storesite, an "Object Unavailable" message is returned (step 14) and the RPC may be attempted at a later time.

If the invocation was performed successfully (step 7c), results will be returned with the best available TAD for the object. The LII layer updates the local TAD and returns the results (step 15).

Referring to FIG. 4, the method executed by the LII layer at a remote node is very similar to the method executed at the initiating node. The steps have been similarly numbered and only the differences are discussed below.

In step 4, the LII layer determines whether there is a "newer" local TAD. To determine this, the remote node will compare the age of its local TAD for the object (if it has one) with the age of the TAD that was used to send the remote node the invocation. If the node's local TAD is not newer, or if there is no local TAD, the "Ask Storesite" subroutine is called (step 10). If there is a newer local TAD, the system proceeds to step 5A. It should be noted that if address descriptors without time information are used (although superior results are achieved using TADs), the LII layer might only determine if the local TAD is different than any previously found TAD "Newer" in this case would mean merely "different" as opposed to "containing more recent information" when TADs are used.

In step 5A, the hop count is incremented by one and compared to the threshold. As discussed above, this ensures that the "chain" does not become excessively long. If the threshold is exceeded, a "hop count exceeded" message is sent to the initiating node with the best TAD (step 5B). Each remote node along the chain will receive the hop count exceeded message and the best TAD on their way back to the initiating node as a response to each remote node s RPC (step 7A). Each of the remote nodes will update their TADs and pass the message and TAD along to the next node in the chain (step 8) until it reaches the initiating node.

Implementation

As discussed above, the LII layer is the intermediary in every invocation (see FIG. 2), directing the invocation to the correct node and object. The LII layer includes a number of "stub procedures" that are automatically generated from the interfaces written by the applications programmer. The stubs mediate every invocation on an object: they find local objects; interact with the RPC system to find remote objects; fix the object during the local invocation (the object obviously should not move during an invocation) update the TADs, etc.

For example, suppose that the application programmer has written the interface of object type Form in the file Form.int; this interface declares the data structures and operations visible to the users of Form. Likewise, the programmer has written the implementation of these operations in the file Form.imp. When writing the procedures in Form.imp, the programmer may safely assume that the object being invoked is local, and that its state can be accessed as a local data structure. Moreover, when writing code that invokes an operation P on a Form object O, the programmer need not be concerned with the location of O: it is left to the LII layer to find 0 and to propagate the invocation to the appropriate node. This is true for invocation statements in Form.imp itself and in other modules such as Book.imp; in either case the programmer writes what appears to be an ordinary object invocation.

To accomplish this, the LII stub generator takes Form.int as input, and produces files FormLocal.imp, which implements the same interface Form.int. It also outputs the files FormRemote.int and FormRemote.imp for the interface and implementation of the remote LII stubs. When some object invokes procedure P on O, it actually calls the stub P of FormLocal.imp (which has the same interface). Stub P checks to see whether O is local. If so, it invokes the real or actual procedure P of Form.imp (as opposed to the stub procedure) propagating back whatever result(s) or exceptions the latter returns. Otherwise, it preforms an RPC of the routine P from FormRemote in the node indicated in O's TAD. FormRemote's P similarly checks whether O is local at its node (i.e., at the remote node), and likewise either calls the local P from Form or propagates the call to the next remote node indicated in its TAD for O. However, if that TAD is obsolete, or if the propagation chain is too long (i.e., if the hop count is exceeded), the latter stub implements the method as discussed above, utilizing the storesites and name service as necessary. FIGS. 6A-D shows the code for two sample LII stubs.

To summarize, the system of the invention performs a three level search for invoked objects. First the system attempts to locate the objects using TADs that should form a complete chain to the current location of the object. This method is attempted first since it is the most economical. However, if any node in the chain has crashed, is otherwise unavailable or has lost its data, the chain will be incomplete and this method will not be successful. The second level of the search then proceeds by attempting to get a current TAD from the storesite that supports the object. The second level is generally more expensive than the first level, but it is move reliable since the storesite is a stable storage server that is not likely to lose its data. Finally, if the object cannot be located with the second level search, the system uses a name service to find the object. The name service is the most expensive of the levels since it is expensive to make updates, but is generally reliable.

The combination of more than one level provides a reliable object locating system that finds objects in the most economical manner. For example, a system that relies solely on forwarding addresses will fail if on of the nodes in the chain has crashed. A system that relies only on stable storage servers must constantly access these servers (which is more costly than accessing dynamic memory in a node) and must permanently store a forwarding pointer at an old stable storage server if the object moves to a new stable storage server. Finally, relying solely on a name service to locate objects has the disadvantage of being the most expensive of the methods. Furthermore, the name service cannot make updates quickly, which results in periods of time when objects cannot be found at all. The present invention also achieves a significant advantage since the LII layer is independent of the particular operating system and programming language.

It should be noted that the preceding description of the invention is merely illustrative and that many changes may be made without departing from the spirit of the invention. For example, the order in which the steps of the invention are carried out may be changed. It may be desirable in a particular application of the invention to attempt to invoke an object by first accessing a stable storage server and thereafter using forwarding addresses or TADs. Similarly, one may decide to use the name service to first obtain a TAD for the object.

What is claimed is:

1. In a system comprising a distributed plurality of computer nodes linked by a communication medium, wherein the system includes objects located on nodes and wherein each of said objects is supported by one or more stable storage servers, a method for invoking an object comprising the following steps, each step being performed with reference to one of the nodes, referred to (in the context of said step) as the current node:
    (a) first generating, at an invoking node, an invocation directed to the object, the invoking node being the current node;
    (b) thereafter performing the invocation if the object is located at the current node and otherwise proceeding to step (c);
    (c) determining if the current node has an address descriptor for the object: if so and if either (i) the current node's address descriptor is newer than the address descriptor used to select this as the current node for this step (c) or (ii) no address descriptor was used to select this as the current node for this step (c), proceeding to step (d); otherwise, proceeding to step (e);
    (d) sending the invocation to the node identified in the address descriptor, the identified node becoming the current node, and proceeding to step (b);
    (e) attempting to locate an address descriptor corresponding to the object in a first stable storage server supporting the object;
    (f) then sending the invocation to the node identified in the address descriptor, if one was located in the step performed before this step is performed, the identified node becoming the current node; and then
    (g) if the object is located at the current node, performing the invocation, and otherwise, proceeding to step (c).

2. The method of claim 1 wherein step (e) further comprises the step of attempting to locate an address descriptor corresponding to the object stored in a second stable storage server supporting the object if the first stable storage server does not contain an address descriptor corresponding to the object, and then proceeding to step (f) if an address descriptor is located.

3. The method of claim 2 further comprising the step of:
    (h) placing on the first stable storage server a pointer to the second stable storage server every time an object is moved from the first storage server to the second storage server.

4. The method of claim 3 wherein said first stable storage server maintains each pointer for at least a predetermined period of time.

5. The method of claim 3 wherein the system further includes a universal name service for storing attributes for uniquely named entities and wherein every object has a unique name, the method of claim 3 wherein step (e) further comprises the step of determining the location of the object through the universal name service if the first stable storage server does not contain either an address descriptor for the object or a pointer to a different stable storage server for the object.

6. The method of claim 5 wherein the universal name service provides the location of a stable storage server that has an address descriptor for the object.

7. The method of claim 1 wherein the address descriptors are temporal address descriptors.

8. The method of claim 7 wherein each temporal address descriptor has an age determined by the number of times its associated object has moved from one node to another node.

9. The method of claim 1 wherein steps (b) and (g) further comprise returning any results of the invocation to the invoking node.

10. The method of claim 1 wherein steps (b) and (g) further comprise returning an address descriptor to the invoking node if the object is located at the current node and the current node is not the invoking node.

11. The method of claim 1 wherein if one of the objects moves from a first node to a second node, a message is sent by one of the two nodes to the stable storage server supporting said one of the objects indicating the address of said second node.

12. The method of claim 1 wherein step (g) further comprises: if the current node (identified in the address descriptor located in the first stable storage server) does not contain the object, attempting to locate an address descriptor corresponding to the object in a stable storage server and if one is found proceeding to step (f).

13. The method of claim 12 wherein in step (g) the attempting to locate an address descriptor is directed to the second stable storage server.

14. The method of claim 13 wherein in step (g) the attempting to locate some address descriptor comprises the step of seeking in the first stable storage server a pointer to the second stable storage server.

* * * * *